(No Model.) 9 Sheets—Sheet 1.
T. COWBURN.
BOOT OR SHOE PEGGING MACHINE.

No. 558,261. Patented Apr. 14, 1896.

Witnesses:
Fred Haynes
George Barry Jr.

Inventor:
Thomas Cowburn
by attorneys
Brown & Seward (No Model.) 9 Sheets—Sheet 3.
T. COWBURN.
BOOT OR SHOE PEGGING MACHINE.

No. 558,261. Patented Apr. 14, 1896.

(No Model.) 9 Sheets—Sheet 4.
T. COWBURN.
BOOT OR SHOE PEGGING MACHINE.
No. 558,261. Patented Apr. 14, 1896.
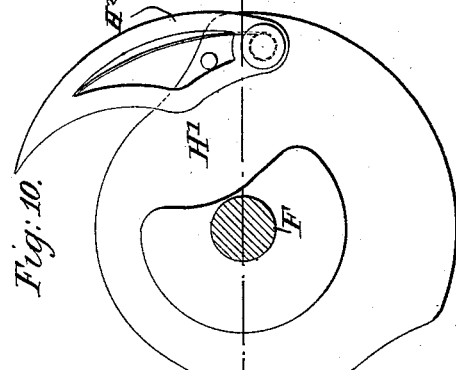
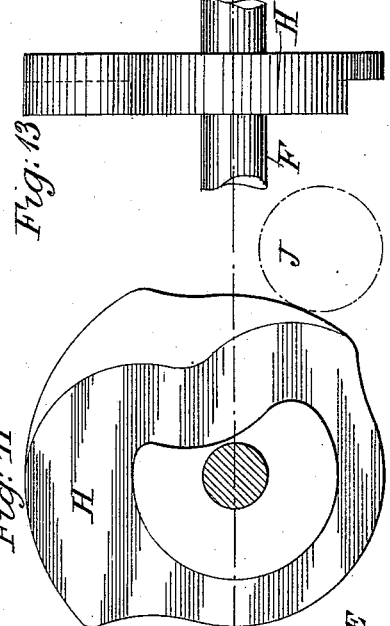
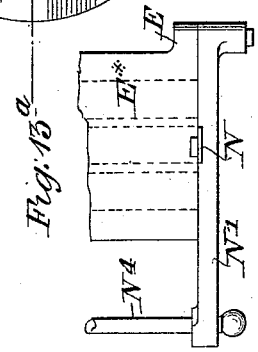
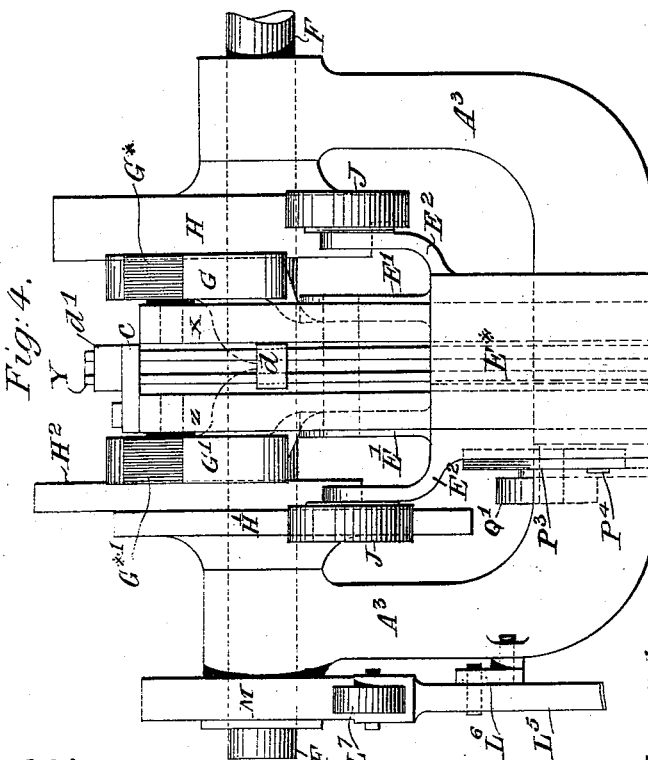
Witnesses:
Fred Haynes
George Barry Jr.
Inventor:
Thomas Cowburn
by attorneys
Brown & Seward

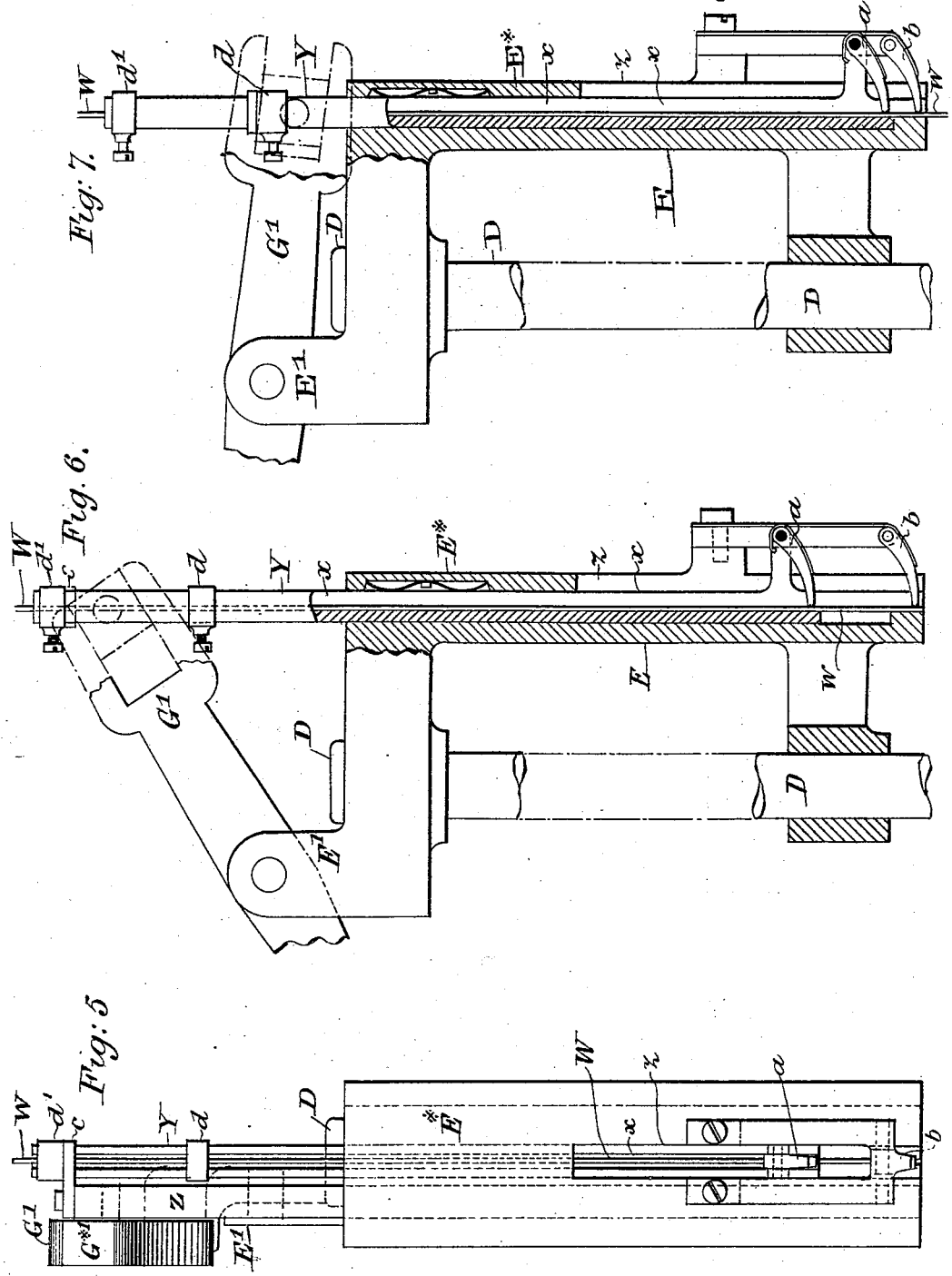

(No Model.) 9 Sheets—Sheet 6.
T. COWBURN.
BOOT OR SHOE PEGGING MACHINE.
No. 558,261. Patented Apr. 14, 1896.
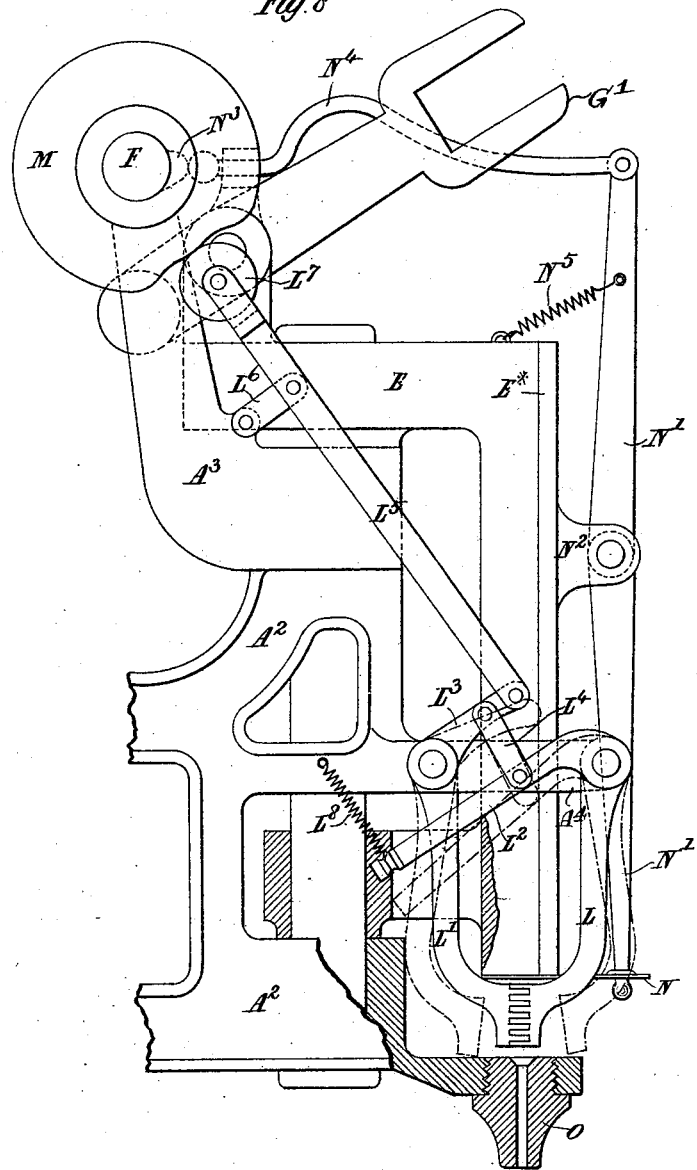

(No Model.) 9 Sheets—Sheet 7.
T. COWBURN.
BOOT OR SHOE PEGGING MACHINE.
No. 558,261. Patented Apr. 14, 1896.
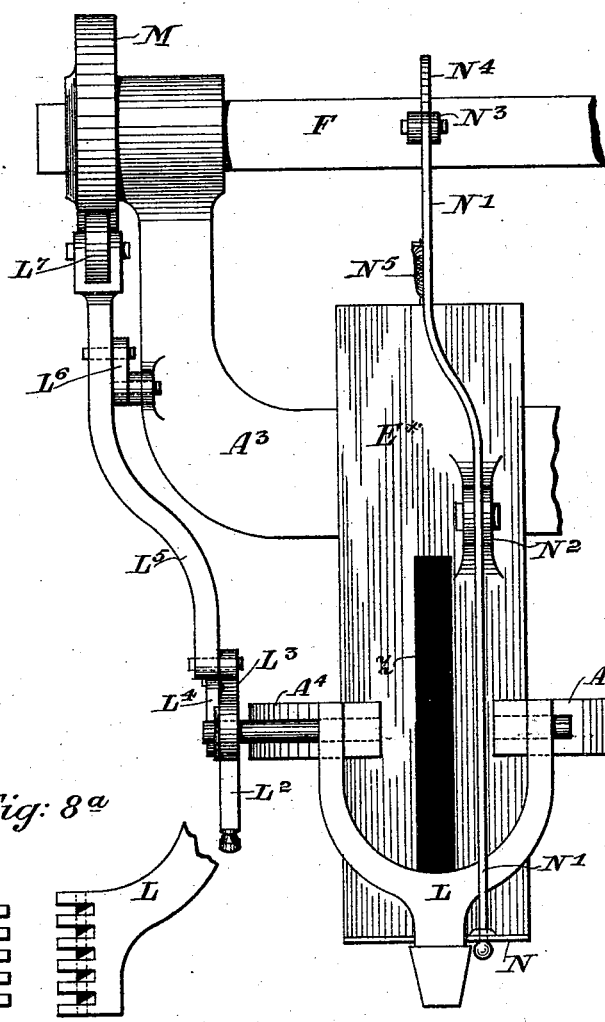
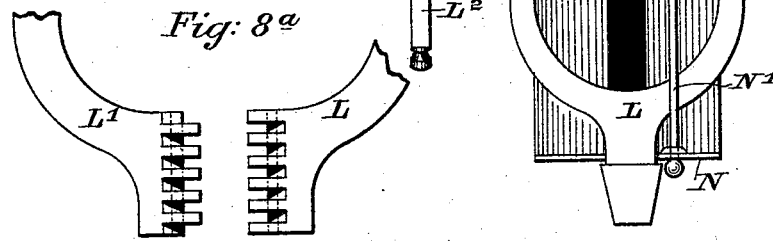
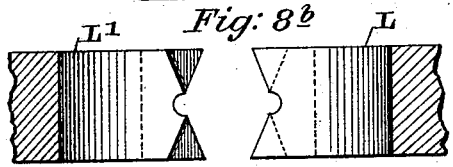
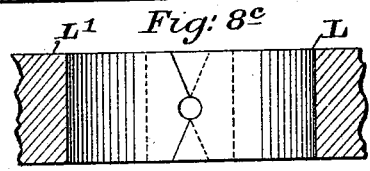
Witnesses:—
Fred Haynes
George Barry Jr.
Inventor:—
Thomas Cowburn
by attorneys
Brown & Seward (No Model.) 9 Sheets—Sheet 8.
T. COWBURN.
BOOT OR SHOE PEGGING MACHINE.

No. 558,261. Patented Apr. 14, 1896.

Witnesses:
Fred'k Haynes
George Barry Jr.

Inventor:
Thomas Cowburn
by attorneys
Brown & Seward

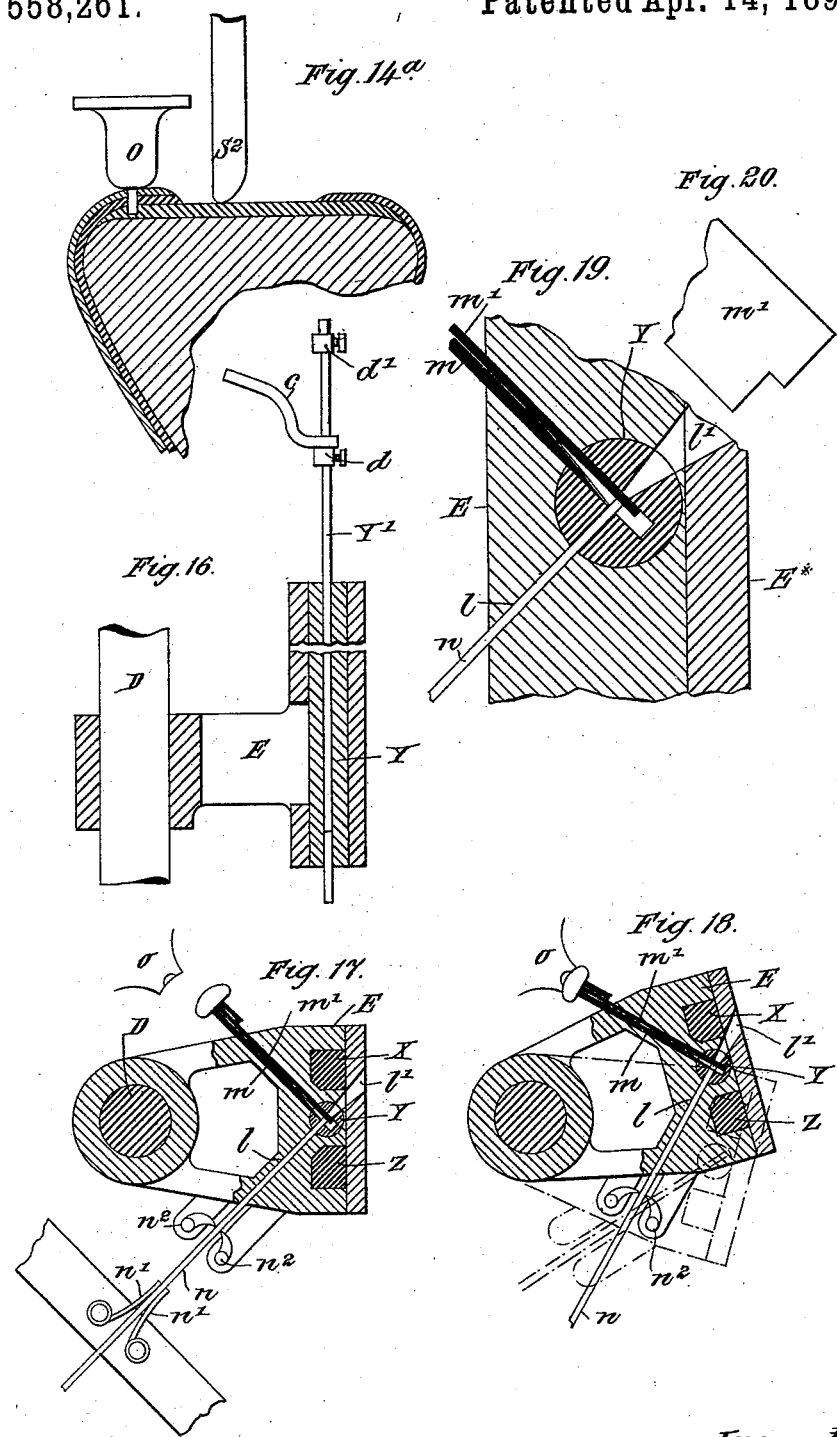

UNITED STATES PATENT OFFICE.

THOMAS COWBURN, OF GLOUCESTER, ENGLAND.

BOOT OR SHOE PEGGING MACHINE.

SPECIFICATION forming part of Letters Patent No. 558,261, dated April 14, 1896.

Application filed September 4, 1895. Serial No. 561,392. (No model.)

*To all whom it may concern:*

Be it known that I, THOMAS COWBURN, engineer, residing at Spring Villa, Brook Street, Gloucester, in the county of Gloucester, England, have invented a new and useful Improvement in Boot or Shoe Pegging Machines, of which the following is a specification.

The object of this invention is to provide, in machine-made boots, for a smooth insole—that is to say, an insole which presents no projections in the shape of the points of the brads or pegs which are used in attaching the upper to the insole, as is usually the case in machine-made boots and shoes, and is obviously a great objection to this class of boot and a source of discomfort to the wearer. This object is effected by causing the awl or piercer to pierce the insole to only part of its thickness and by providing pegs which are of such a length as to penetrate the insole the same distance only as the piercer.

It is well known that the thickness of the sole varies according to the part of the boot—that is to say, the sole at the waist will be thinner than the sole at the ball of the foot, and consequently the piercer must penetrate a less depth—and the pegs must be shorter for one part of the sole than for another.

An important part of this invention consists in means hereinafter described whereby the movement of the piercer and the length of the peg will be regulated as required.

Figure 1:
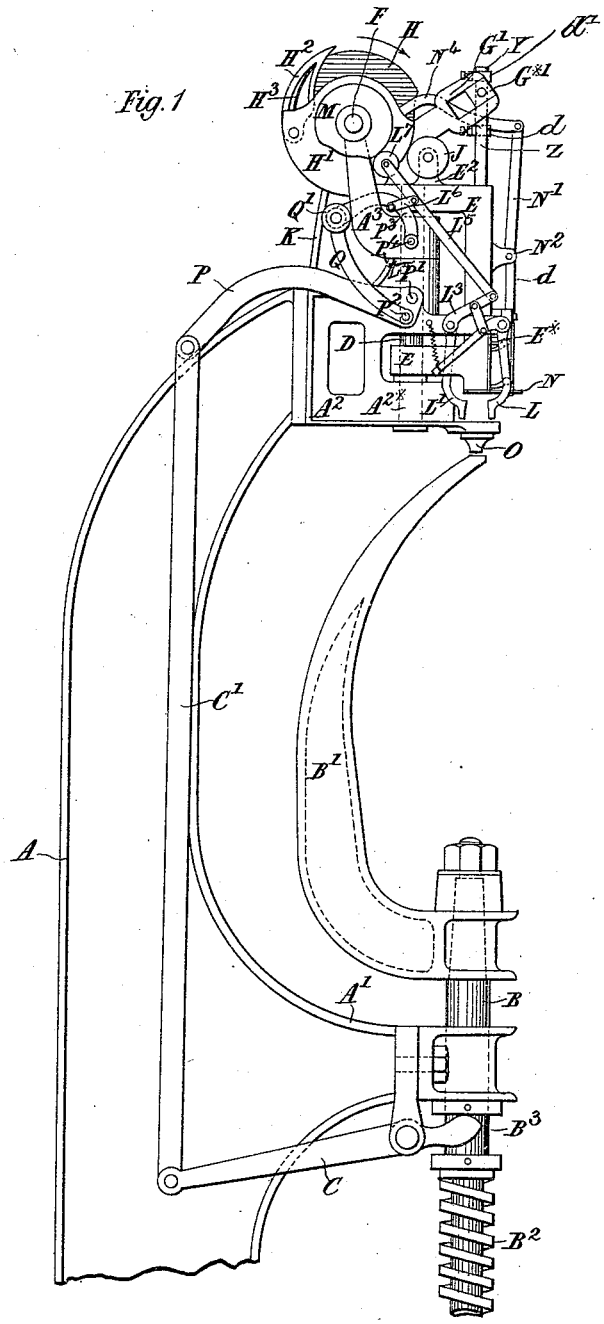
Figure 2:
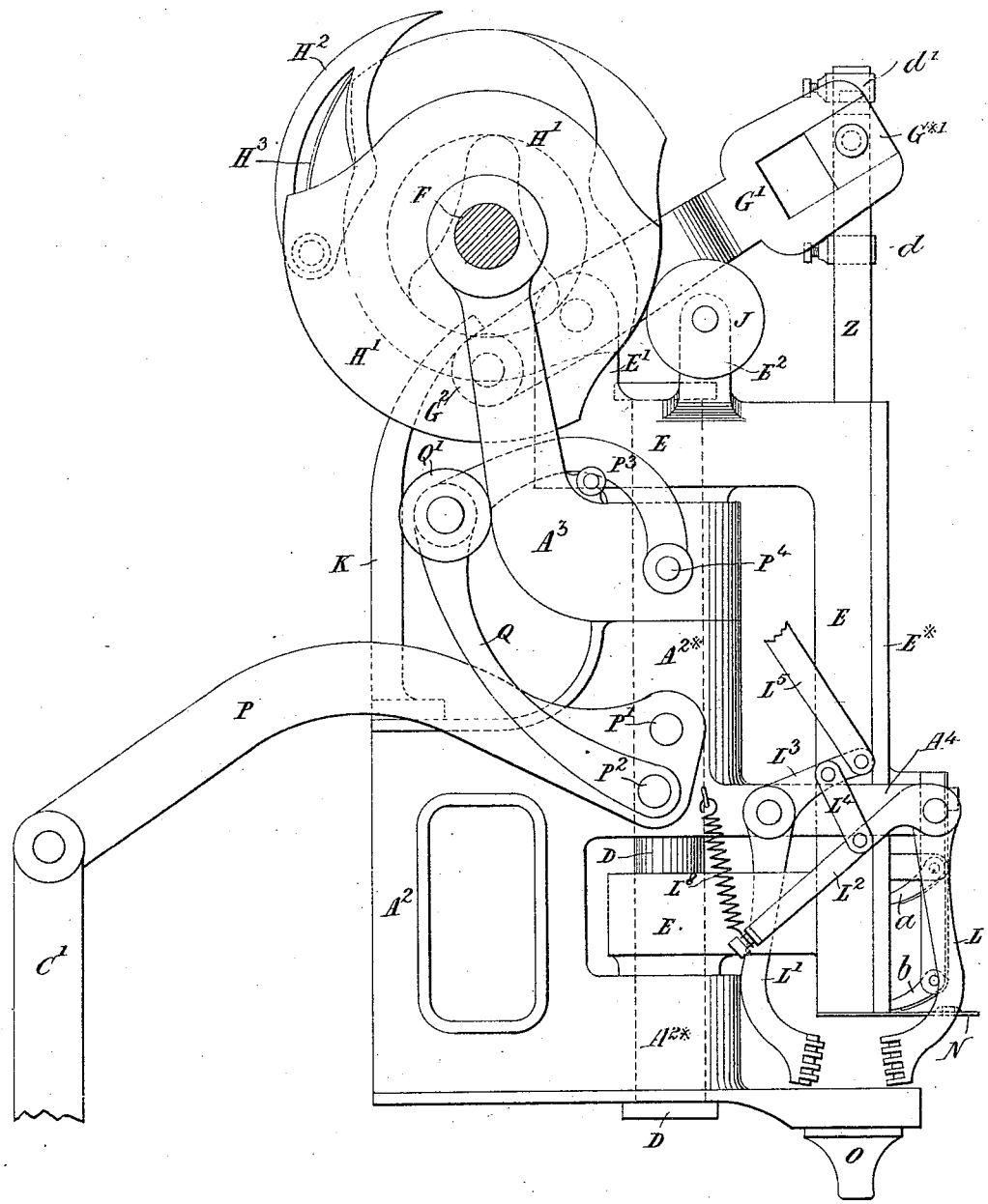
Figure 3:
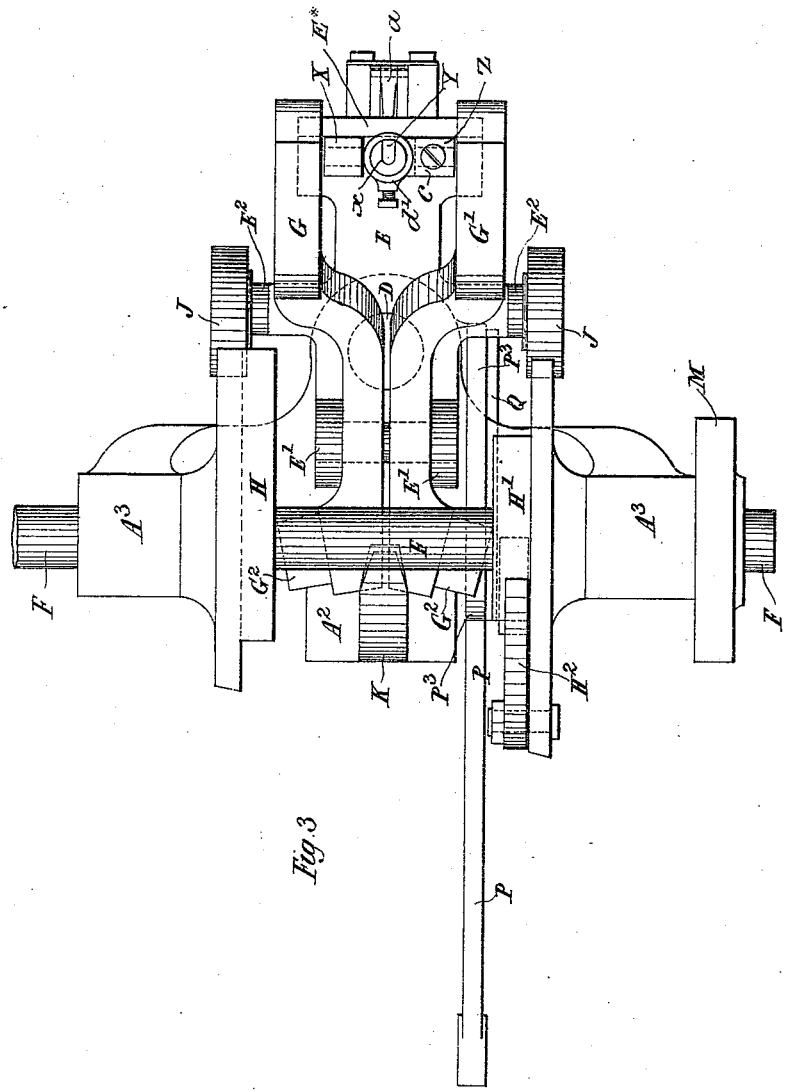
Figure 14:
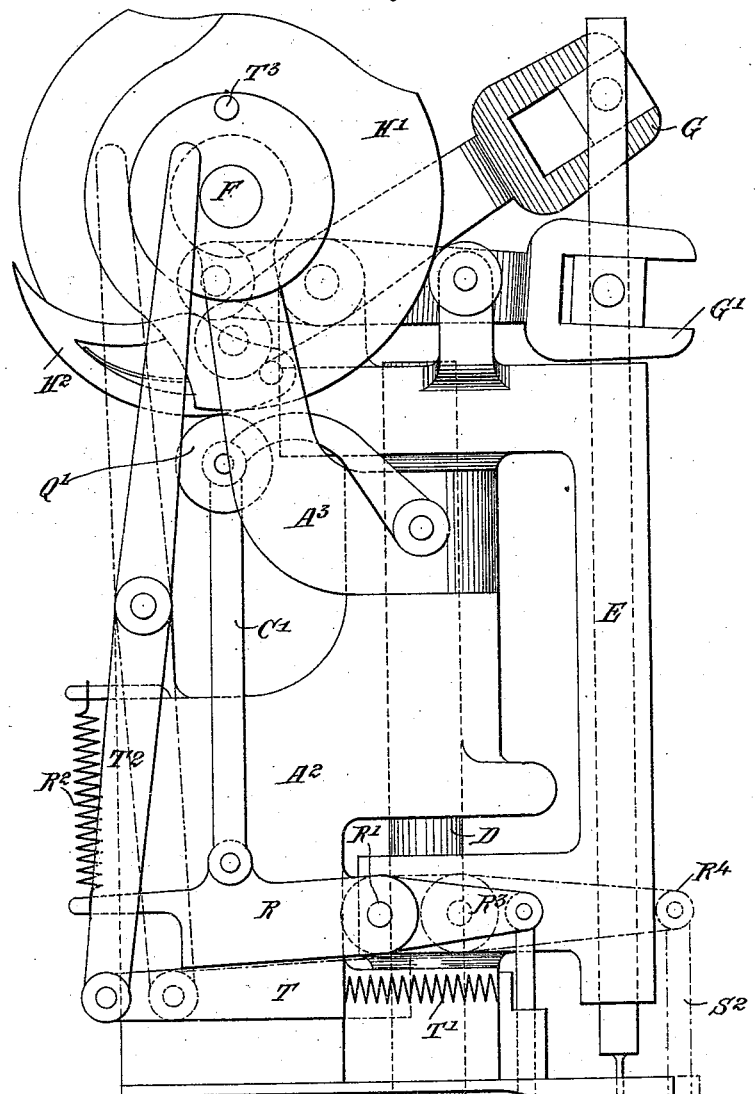
Figure 15:
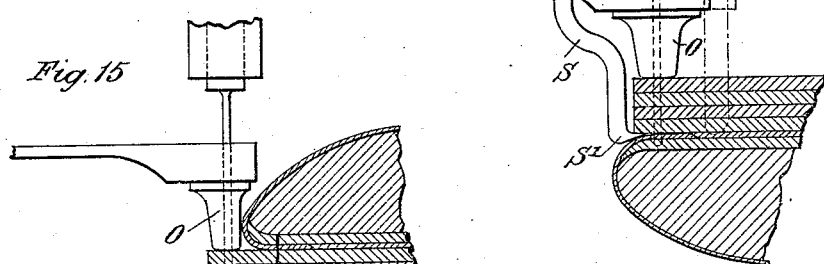

In the accompanying drawings, Figure 1 is a side view of the machine, the lower part or base being removed, as it forms no part of the present invention. Fig. 2 is a side view, on an enlarged scale, of the head of the machine, some parts being omitted for the sake of clearness. Fig. 3 is a top plan view of the head, and Fig. 4 a partial front elevation of the same. Fig. 5 is a front view of the feed mechanism for feeding the strip or "wire" from which the peg is to be cut, Figs. 6 and 7 being side views, partly in section, of the same mechanism, showing the parts in two positions. Figs. 8 and 9 are respectively a side view, partly in section, and a front view of the gripping mechanism for holding the wire for the peg and cutting off the peg of the required length. Figs. 8ª, 8ᵇ, and 8ᶜ are detail views showing the construction of the gripping-faces in side view and plan view in the open position and in plan view in the closed position, respectively. Figs. 10 and 11 are side views, and Figs. 12 and 13 corresponding edge views, of the cams for operating the piercer and the driver. Figs. 13ª and 13ᵇ are front view and plan of the form of cutting-knife it is desired to use. Fig. 14 is a side elevation of the head as required for soling on a last, the tread of the sole being upward, Fig. 14ª showing in diagram the position of the feeler when lasting. Fig. 15 shows in a detached view the mechanism arranged for soling on a horn downward from the welt side. Figs. 16 to 20 show in detail the mechanism for feeding and cutting off the pegs from a strip of wood in contradistinction to a wire of leather or wood. Thus Fig. 16 is a partial sectional elevation of the swinging frame. Fig. 17 is a sectional plan showing the devices for holding and cutting the strip. Fig. 18 indicates the two positions of the swinging frame when piercing the material and when driving the peg. Fig. 19 shows in section, on an enlarged scale, the feed-rod and vertical knife; and Fig. 20 is a front view of the vertical-knife stop-plate.

The same letters of reference will apply to corresponding parts in all the figures.

In carrying out this invention with respect to lasting I place the upper of the boot or shoe on an iron last carried in the machine by a jack or holder, as usual, and as each portion of the upper is pulled over the last by hand I secure it to the insole by automatically piercing a hole through the upper and into the insole and placing therein a pin or screw of leather, wood, or like substance cut from a strip or wire and driven home by a driver. When applying the invention to the operation of soling or welting, I support the boot or shoe on a horn or post common to this class of machinery.

To provide for the automatic regulation of the depth the piercing-tool shall penetrate the sole or insole without the needle striking against the iron last when lasting and piercing to the interior of the boot or shoe when soling or welting, I mount upon the stem usually carrying the horn in this class of machine a "jack" or last-holder of any ordinary description. This stem is made capable of the required lateral motion to bring in turn every part of the last under operation. The stem is borne upward by a spiral spring to hold the boot or shoe up to the nozzle of the riveting-head.

The head of the machine consists of a framework in which is mounted in bearings a vertical spindle serving as a fulcrum for a laterally-swinging head carrying the piercing-tool, the feed-tube, and the driver. This swinging head is moved laterally for the purpose of bringing these tools in succession over the central line of a nozzle carried by the frame (a short distance below the lower end of the swinging head) by means of a pair of disk cams mounted on a horizontal shaft carried by a bracket from the fixed head. This shaft may be driven in any convenient manner.

The piercing-tool and the driver consist of rods mounted in socket-bearings in the swinging head and having at their upper ends lateral projecting pins or blocks, which take in the forked ends of a pair of horizontal rock-levers fulcrumed on the swinging frame and having bowls at their rear ends, which enter grooves in the sides of the disk cams to give the levers their up-and-down motion.

The cam operating the rock-lever of the piercing-tool is fitted with a wing at its side to form the operating-groove. This wing is capable of changing its position so as to give greater or less motion to the rock-lever and consequently to the piercing-tool. The position of this wing on the cam is automatically regulated, according to the varying thickness or position of the work, in the following manner when the horn is used as a support for the work.

Two horizontal rock-levers are fulcrumed in the machine, one just below the cams and the other below the journal of the horn. The rear ends of the levers are connected by a link. The short end of the lower lever enters the groove of a collar on the stem, and the upper lever is provided with a movable arm carrying a bowl for acting on the periphery of the wing on the cam. Thus as the stem carrying the last-holder or horn is depressed by the varying thickness or position of the work the wing on the cam will be closed up, giving greater throw to the end of the rock-lever, and thereby to the piercing-tool, and vice versa.

When the last is used to support and carry the work, the upper rock-lever only will be required. A pendent rod jointed to the forward end of this lever carries at its lower end a finger which bears on the upper (in the crease) of the boot or upon the insole, as the case may be, thereby regulating the stroke of the piercing-tool. To prevent the finger unduly pressing upon the upper and to hold the lever in position while the piercer is being driven, a wedge-block is brought under the rear end of the lever by a spring, and when the pin is driven in the wedge-block is withdrawn by the action of an incline on one of the cams.

The feed-tube is fitted with an arrangement of tappets operated from a projecting pin or lug at the upper end of the piercing-tool. The wire of leather or wood from which the pin is to be made passes down the feed-tube and is caught near the bottom by two gripping-fingers, one of which is stationary and the other moves with the tube. This finger presses on and carries down with the tube a portion of the strip of leather, the stationary retaining-finger preventing its subsequent withdrawal.

A knife is provided to cut off the required portion to form a rivet. This portion, as soon as it is pushed out, is seized by a pair of fingers between the nozzle and the lower end of the swinging head and held until, by the automatic action of the cams upon the swinging head, the feed is laterally shifted and the driver brought over the severed portion of material, which will then be driven out of the grip of the fingers into the hole formed in the insole to receive it, thus securely riveting or securing with a wood or leather pin the upper to the insole without passing entirely through the insole.

The material from which the pins are formed will, in general, be supplied to the machine in the form of wire, as before mentioned; but I may use a ribbon of wood or other material the width of the longest pin and sever a strip from the ribbon just before placing it in the feed-tube. The cross-cutting knife will then, as before, cut it to the length required for the thickness of the work at this time under operation.

Referring now to the drawings, A is a standard which rises from a suitable base or foundation (not shown) and carries at its upper end the mechanisms which form the principal features of the present invention. About midway of its height the standard A is formed with a bracket A', provided with a bearing in which slides a vertical rod or spindle B, carrying the post or horn B', or it may be a jack for a last. This rod B is kept in a raised position by a spring B² and is provided with a circumferentially-grooved collar or sleeve B³, in the groove of which works the forked arm of a lever C. This lever C is connected by the rod C' with part of the mechanism of the head, as will be presently more fully described.

A² is the head extending from the standard A and having bracket-bearings A²* A²* for the vertical spindle D. Mounted upon this spindle D is a swinging frame E, which consists of two arms connected by a plate, in which are formed three vertical recesses. Extending upward from the head A² are brackets A³ A³, in which are the bearings for a cam-shaft F, which is also the driving-shaft.

Standing up from the back of the swinging frame E are lugs E', which carry in bearings an axle, on which forked levers G G' are mounted. G² are bowls carried by the levers G G' and set at a slight angle, as seen in Fig. 3. These bowls G² enter the groove of one or other of the cams H H' (which I designate the "driver-cam" and the "piercer-cam," respectively) on the shaft F as the frame E is swung to one side or the other, the action of the cams being to rock the levers on their pivots to operate the respective piercing and driving tools or instruments. This swinging motion is effected automatically by means of the bowls J, which are carried by brackets E², extending upward from the frame E and run in contact with the edge of the cams H H'. These cams are so adjusted that a full portion of one cam will be opposite one bowl when a cut-away portion of the other cam is opposite the other bowl, and in this way the frame is swung to the right or left at the desired moment to bring one of the bowls G² into the groove of its own cam H or H'.

When the frame is in a central position, the levers G G' are held up out of action by means of a fixed curved finger K, which will overlie the tail end of the levers, as seen at Figs. 2 and 3.

The swinging frame E is formed to receive three rods, which represent, respectively, a driver X, a feeder Y, and a piercer Z. The rod or driver X is pivoted to a block G*, which slides in the fork of the lever G, while the rod or piercer Z is pivoted to a block G*', which slides in the fork of the lever G', as seen in Figs. 2 and 4, and these rods are depressed according as the bowl G² of the particular lever G or G' is in the groove of the driver-cam H or the piercer-cam H' to drive in the peg or to pierce the material with the awl, as will be hereinafter more fully described.

The piercer will consist of a pointed instrument of the proper size, fitted into the end of the bar or rod Z after the manner of a needle in the needle-bar of a sewing-machine or in any other convenient manner and the driver, which will be fitted in like manner, to the bar or rod X, will consist of a blunt instrument of the same diameter as the piercer.

The feed mechanism which is intended to feed forward the wire of leather or wood to form the peg or rivet will now be described.

The feeder Y consists of a round bar or rod, which is slotted or grooved, as shown at $x$, Figs. 3, 5, 6, and 7, from end to end to receive the wire. The wire W passes in at one end of the slot or groove and out at the other end. Near the lower end of the bar Y are two projecting lugs, between which is pivoted a gripping-finger $a$, held in position by a spring. The end of this finger enters the slot in the bar, and under the influence of the spring presses on the wire W, holding it to the rod Y with sufficient force to draw forward a supply from a reel or other holder when the feeder-rod moves down. A portion of wire will thus be forced out beyond the swinging frame E to be utilized in the manner hereinafter described. The swinging frame E is also slotted at $z$ to correspond with the slot in the bar Y, and projecting into this slot is a gripping-finger $b$, carried by lugs on the face E* of the swinging frame. The end of this gripping-finger, under the influence of a spring, presses on the wire W at a point below the end of the feed-rod at its lowest position and jams it against the swinging frame, so that the wire will not be drawn back by the upward return motion of the feed-rod Y.

At the upper end of the feeder-rod Y are two adjustable tappets $d$ and $d'$, between which projects a bracket-arm, pin, or lug $c$, secured on the top of the piercer-rod Z. When the lever G' operating the piercer-rod Z is descending from the position of Fig. 6 to the position shown at Fig. 7, the arm $c$, after an amount of lost motion, will strike the lower tappet $d$ and carry down the feeder-rod Y, and with it the wire, as shown at Fig. 7.

On the return movement of the lever G' the arm $c$, as it nears the extent of its upward motion, will strike the tappet $d'$, carrying up with it the feeder-rod Y, its gripping-finger $a$ slipping over the wire, which is retained by the action of the gripping-finger $b$. On the feed-rod attaining its highest position, Fig. 6, the gripping-finger $a$ will take hold of the wire and at a higher point, so that a fresh portion of the wire will be drawn from the supply into the feed-rod with the next downward movement of the rod Y.

When the portion of the wire is thus pushed out from the swinging frame E, which will then be at the central position of its movement, it is seized by a pair of grippers L L', (see Figs. 1, 2, 8, and 9,) which at their gripping edges are formed to interlock. The exact form of the grippers L L' is clearly shown in the detail Figs. 8ª, 8ᵇ, and 8ᶜ, which are, respectively, a side view and plan view of the grippers open and a plan view of the grippers closed. These grippers L L' are keyed on axles mounted in bearings in curved brackets A⁴, projecting from the head A² and around the swinging frame E. On one axle of each jaw is keyed an arm L² L³, which arms are connected together by a link L⁴. To the arm L³ is pivoted the rod L⁵, which is connected by a link L⁶ to the bracket A³ and serves to insure a more or less parallel movement of the rod L⁵. This rod carries at its upper end a bowl L⁷, which runs in contact with the edge of a cam M, (see Fig. 4,) mounted on the shaft F. To the outer end of the arm L³ is attached a spring L⁸, the action of which is to close the grippers and keep the bowl L⁷ in contact with the cam M.

The grippers are shown open in Fig. 1 and closed in Fig. 8, though the open position is also shown in dotted lines in this figure.

When the projecting wire is firmly held by the grippers, a knife-blade N is brought forward to cut off the requisite length for the peg or rivet. This knife-blade N, which is shown at Figs. 1, 2, 8, and 9, is mounted in V-guides attached to the bottom of the swinging frame E and is operated (see Figs. 1, 8, and 9) by the lever N', which is fulcrumed at $N^2$ to the cover-plate $E^*$ of the frame E. This lever is actuated by the cam projection $N^3$ on the shaft F through the rod $N^4$, which works in a suitable guide, a spring $N^5$ being provided to keep the rounded end of this rod $N^4$ up to the cam.

The form of knife N which it is desired to use is shown at Figs. $13^a$ and $13^b$ and consists of a horizontally-reciprocating arm N', fulcrumed on a lug projecting from the side of the swinging frame E and carrying a knife-blade on its inner edge. This arm is reciprocated by the rock-lever $N^4$, pivoted on the frame E and operated by a cam on the shaft F. This form of knife will give a more shearing cut and is better suited to pegs of other materials than leather.

When the peg has been cut off, the driver X is brought into position and the peg is forced down into the material through the nozzle or guide O, against which the material rests.

I will now proceed to describe the mechanism for regulating the depth of piercing and the length of the peg.

The horn or post B' is kept up to the nozzle O by the spring $B^2$ on the spindle B. (See Fig. 1.) It will be evident that by placing thicknesses of material between the horn and the nozzle the horn will be pressed down more or less. This movement of the horn will depress the shorter arm of the forked lever C more or less, so as to raise the longer arm and the connecting-rod C', which will operate the regulating mechanism. This mechanism consists of the curved lever P, fulcrumed at P' to the head $A^2$. Pivoted to this lever P at $P^2$ (see Fig. 2,) below the fulcrum P', is an upwardly-projecting curved arm Q, which carries at its upper end a bowl Q' and is held in position by a curved radius-bar $P^3$, which is fulcrumed at $P^4$ on the bracket $A^3$. This mechanism is used in combination with the piercer-cam H', which is provided with a wing or adjustable cam-surface $H^2$. (See Figs. 2, 10, and 12.) This wing $H^2$ is pivoted to the side of the cam H' and is held in its normal position—that is, away from the cam-shaft F—by a spring $H^3$.

As the cam H' rotates this wing will come into contact with the bowl Q', and it will be evident that if this bowl is raised by the depression of the horn the wing $H^2$ as it comes around will be pressed inward toward the shaft F of the cam H'. The inner face of this wing $H^2$ is the actuating cam-surface against which the bowl $G^2$ of the lever G' works, and consequently the more the wing $H^2$ is pushed in the greater will be the rocking motion given to the lever G' and the greater will be the movement of the piercer Z. Thus according to the thickness of material between the nozzle O and the horn B' so will be the depth to which the piercer Z descends, and so will be the length of the peg that is cut off, because the feed of the wire is regulated by the movement of the piercer-lever G', as before explained.

The cams H H' are shown at Figs. 10, 11, 12, and 13, Figs. 10 and 11 being inside views of the piercer-cam H' and the driver-cam H, respectively, and Figs. 12 and 13 corresponding edge views.

The mechanism heretofore described is more particularly applicable for lasting—that is to say, for tacking the upper to the insole previous to riveting on the sole—but with slight modifications the machine may be used for soling from the face or tread of the sole or from the welt side.

I will now proceed to describe such modifications which are shown with reference to Figs. 14 and 15.

In Fig. 14 the rod C' is connected to a lever R, which has its fulcrum at R' on the head $A^2$. At one end this lever is held up by a spring $R^2$. On the other side of the fulcrum this lever is formed with a short arm $R^3$ and a long arm $R^4$. To the short arm $R^3$ is pivoted the bent rod S, provided with a lateral projection S', constituting a feeler which presses during working in the crease of the boot, as shown, the boot being carried on the last. In the figure four thicknesses of sole-leather are shown; but these thicknesses will, in some parts, be pared away, and thus the total thickness will be less. Consequently the last being pressed upward by the spring $B^2$, Fig. 1, the position of the crease will be higher. The rod S will thus be raised, which will rock the lever, the rod C' will be drawn down, and the regulating-bowl Q' will be withdrawn from the path of the winged cam $H^2$, and the movement of the piercer Z and feeder Y will be correspondingly reduced.

During the piercing operation it is necessary that the lever R and its accessories shall be held firmly or rigid, and for this purpose I form the under side of the lever R with an inclined face, and I adapt underneath it a wedge T, which is operated against the pressure of a spring T' by the lever $T^2$. This lever $T^2$ is rocked by means of the pin $T^3$, carried by the piercer-cam H', or by a disk on the cam-axle F. To the longer arm $R^4$ of the lever R is pivoted a rod $S^2$, which bears upon the insole, constituting a feeler and serving to regulate the depth to which the piercer operates when it is desired to secure the upper to the insole, as in the operation of lasting. This operation is more clearly shown on the diagram Fig. $14^a$.

In Fig. 15 the mode of securing the sole to the welt is shown, the boot being carried by a horn or post. In this arrangement I provide a gage $S^3$, which I secure to the point of the post, and this gage insures the row of holes which are pierced and the pegs which are inserted always being at a regular distance from the edge of the sole. When a strip of wood or other material is used from which the peg is cut prior to being driven, I provide an additional knife, and the swinging frame is arranged as shown in Figs. 16 to 20. The swinging frame E and the feed-rod Y (which in this case does not reciprocate) are slotted in a diagonal direction, as shown at $l$, Figs. 17, 18, and 19, for the entrance of the strip, and I slot the swinging frame and the feed-bar at right angles to the slot $l$ and in a diagonal direction to receive an additional knife $m$. On the opposite side of the center line of the feed-bar Y and also in the swinging frame I form a splayed-out slot $l'$, as clearly seen in the enlarged section, Fig. 19, (which I will call the "ejecting-slot" $l'$.) The strip of wood represented by $n$ passes first between a fixed pair of spring-grippers $n'$ and then through a second pair of grippers $n^2$ (carried on the lugs of the swinging frame) into the slot $l$ of the frame E and the feed-bar. O is a fixed stop, against which a button on the end of the knife $m$ strikes as the frame E swings. The knife $m$ consists of two parts—namely, a cutting-blade and a stop-plate $m'$—which lie side by side. The stop-plate is formed, as shown at Fig. 20, with a recessed portion, and the peg, when it is cut off from the strip by the cutting-blade, will be always the same size, and in its length will extend partly across the recess. Passing down through the hollow feed-bar Y is a rod $Y'$, provided at its upper end with a pair of adjustable tappets $d$ $d'$, and between these tappets projects the bracket $c$, carried by the piercer-rod or forked lever $G'$, like that previously described. When the feeder-rod $Y'$ descends, the peg will be driven into and between the grippers L L' and is cut off the correct length by the knife N, as before. The extra portion of the peg which is cut off by the knife N will remain behind, and it is pushed through the recess by the advancing strip $n$ into the ejecting-slot $l'$, from which it falls to the ground or into a suitably-placed receptacle.

The action will be as follows: The swinging frame E is brought into the position shown at Fig. 18—that is to say, the piercer Z is in the position to pierce the material. At the same time the knife-head strikes against the stop $o$, and the knife is driven forward to cut off the peg transversely from the strip. The frame E is then swung to bring the feed Y into the central position, and by means of feeder-rod $Y'$, operated as above described, the peg is driven down and seized by the grippers, the peg being cut to its proper length by the knife N, as before. The frame is next swung into the dotted position, Fig. 18, so that the driver X is brought into position, and the peg is driven into the work. The swinging of the frame will feed the strip $n$ forward against the stop-plate, and thus a fresh portion of the strip will be presented to the cutting-blade. The frame is now swung back again to bring the piercer Z into position and to cut off the peg, when the operation is repeated as before.

I will now proceed to describe generally the action of the machine. Let it be supposed it is desired to attach the upper to the insole in the lasting operation and the material is between the nozzle O and the horn B or last. Motion is communicated to the cam-shaft F in any convenient manner. The mode of driving forms no part of the present invention, and beyond the indication that it is preferred the driving mechanism shall be thrown in and out of gear by a treadle movement no description is necessary. The rotation of the cams H H' (which are properly set for the purpose) will swing the frame E by means of the bowls J, which bear against the peripheries of the cams. Let it be supposed that the frame E is swung to the right to bring the piercer Z into position, as in Fig. 18. The bowl $G^2$ of the lever $G'$ will be in the groove of the cam H'. The form of the groove will depend upon the position of the wing $H^2$, which is regulated by the thickness of material between the nozzle O and the horn or last through the parts C' P Q Q', as before indicated. According to the position of the wing $H^2$, so the movement of the lever $G'$ will be greater or less and the piercer Z will pierce to a greater or less depth. The swinging frame will be stationary while the operations of piercing, feeding, and driving are taking place, the arresting of the movement being due to the form of the cams. The piercer Z being withdrawn, the frame E swings to the left to bring the feeder Y into the position shown at Fig. 3. The feed of the wire into the teeth of the grippers L L' then takes place, and the wire is cut off the exact length required by the knife N. The frame E is now swung farther to the left to bring the driver X into position, and at the same time the bowl $G^2$ of the lever G enters the groove of its cam H. As the cam H rotates the lever G is rocked on its pivot and the driver X is forced down to drive the peg (which is held by the grippers L L') into the hole that has been made by the piercer Z. As the peg is always cut off to the exact length required, whatever it may be, and the difference in the depth to which it is to be driven is therefore provided for, the amount of movement given to the driver X is always the same. As soon as the driver X has effected its purpose and is withdrawn the grippers L L' are opened, the swinging frame E is again swung to the right, and the operations of piercing, feeding, cutting off, and driving proceed as before. A feed-foot of the usual kind will be provided to shift the work along when soling or welting.

Having now described the nature of my said invention and the manner of carrying the same into effect, I would here remark that I do not intend to confine myself to the exact mechanical details shown and described, as these may be modified without departing from my invention, and I therefore desire it to be understood that what I claim is—

1. In a machine for pegging and riveting boots and shoes, the combination of a yielding support B', a fixed nozzle O, a piercing instrument, wire-feeding and peg-cutting instruments, a driving instrument, levers G G' N' for operating the said instruments, a swinging frame carrying said instruments and levers, a driving-shaft and cams H H' N³ thereon for operating said levers and instruments, the said cam H' which operates the piercing instrument and feeding instrument being adjustable, mechanism for automatically changing the adjustment of the said cam operated by the yielding support, grippers for holding the cut-off peg and mechanism for operating the said grippers, the whole carried by a standard and operating as and for the purposes herein set forth.

2. In a machine for pegging or riveting boots and shoes, the combination with devices for feeding a wire of wood or leather and for cutting off a peg and an instrument for driving the peg, of a pair of interlocking grippers to receive and hold the cut-off peg in the path of the driving instrument, and mechanism for operating the said grippers, as and for the purposes herein set forth.

3. In a machine for pegging or riveting boots and shoes, the combination of a piercer and a wire-feeder, a lever for operating the piercer and feeder, and an automatically-adjustable cam for giving said lever a greater or less movement according to the required depth of piercing and the length of wire to be fed, substantially as herein set forth.

4. In a pegging and riveting machine for boots and shoes, the combination of an adjustable cam, mechanism for automatically changing the adjustment of said cam, a yielding support for the boots or shoes and a connection between said support and said mechanism, as and for the purposes set forth.

5. In a pegging or riveting machine for boots and shoes, the combination of a fixed head carrying a cam-shaft, with a swinging frame containing a piercer, a feeder, cutting-knives and a driver, levers pivoted in the swinging frame to operate the instruments, means for swinging the frame, and cams on the shaft for operating the levers, as and for the purposes set forth.

6. The combination with the operating-lever of the piercer, of a feeder-rod carrying the wire, means for temporarily connecting the lever and the rod, means for gripping the wire in the rod, and means for holding the wire during the return of the rod, as and for the purpose set forth.

7. In a machine for pegging or riveting boots and shoes, a pair of grippers for seizing the peg, consisting of two jaws having interlocking portions formed with inclined faces converging to a central semicircular recess, and means for closing the grippers from the cam-shaft, the said grippers being so positioned, that the central hole formed when the jaws close shall be in the path of the driver, and in line with the nozzle, as and for the purpose set forth.

8. In a boot and shoe pegging and riveting machine, the combination with a fixed nozzle, a yielding support, a cam having an adjustable wing, a feeler controlled by the boot or shoe on the yielding support, and a connection between said feeler and said adjustable wing, substantially as and for the purpose herein set forth.

THOMAS COWBURN.

Witnesses:
 ARNOLD KYRKE PALIN,
 ARNOLD H. PALIN.